US012443257B2

(12) United States Patent
Veerabagu et al.

(10) Patent No.: US 12,443,257 B2
(45) Date of Patent: Oct. 14, 2025

(54) LOW COST FAIL-2-WIRE CIRCUIT

(71) Applicant: Palo Alto Networks, Inc., Santa Clara, CA (US)

(72) Inventors: Subramaniam Veerabagu, Santa Clara, CA (US); Jeslin Antony Puthenparambil, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 124 days.

(21) Appl. No.: 18/225,426

(22) Filed: Jul. 24, 2023

(65) Prior Publication Data

US 2025/0036180 A1 Jan. 30, 2025

(51) Int. Cl.
*G06F 1/28* (2006.01)

(52) U.S. Cl.
CPC ..................................... *G06F 1/28* (2013.01)

(58) Field of Classification Search
CPC ....................................................... G06F 1/28
See application file for complete search history.

(56) References Cited

U.S. PATENT DOCUMENTS

| 5,430,600 | A  | 7/1995  | Burns |
| 7,964,989 | B1 | 6/2011  | Puschnigg |
| 8,971,792 | B2 | 3/2015  | Riggsby |
| 9,065,588 | B1 | 6/2015  | Smith |
| 9,281,147 | B2 | 3/2016  | Elberbaum |
| 9,875,867 | B2 | 1/2018  | Marchand |
| 10,049,830 | B2 | 8/2018 | Pham |
| 10,439,752 | B2 | 10/2019 | Wang |
| 10,840,735 | B1 | 11/2020 | Cooper |
| 10,854,407 | B2 | 12/2020 | Khan |
| 10,944,288 | B2 | 3/2021  | Hermans |
| 11,171,508 | B2 | 11/2021 | Ferguson |
| 11,317,499 | B2 | 4/2022  | Norton |
| 2006/0217847 | A1 | 9/2006 | Anderson |

(Continued)

FOREIGN PATENT DOCUMENTS

| DE | 102012107483 | 2/2014 |
| DE | 102010031235 | 7/2016 |

(Continued)

OTHER PUBLICATIONS

Author Unknown, Behavior of SensorSwitch™ Products After Internal Failure, Dec. 31, 2020.

(Continued)

*Primary Examiner* — Zahid Choudhury
(74) *Attorney, Agent, or Firm* — Van Pelt, Yi & James LLP

(57) ABSTRACT

A power loss detector monitors a power supply to a monitored networking device to detect an imminent power loss, where a port of the monitored networking device is connected to a bypass module. A bypass controller in a bypass module in response to detecting the imminent power loss, determines whether to bypass the monitored networking device; and in the event it is determined to bypass the monitored networking device, configures an electromechanical relay in the bypass module to create a new connection associated with the port of the monitored networking device that bypasses the monitored networking device. The configured electromechanical relay maintains the new connection for at least some time after the imminent power loss.

20 Claims, 10 Drawing Sheets

(56) References Cited

U.S. PATENT DOCUMENTS

| | | | | |
|---|---|---|---|---|
| 2011/0211833 A1* | 9/2011 | Chen | ............... | H02J 9/06 |
| | | | | 398/45 |
| 2012/0023340 A1* | 1/2012 | Cheung | ............... | G06F 1/266 |
| | | | | 370/252 |
| 2019/0348241 A1* | 11/2019 | Kramer | ............... | H01H 47/18 |
| 2021/0057179 A1 | 2/2021 | Park | | |
| 2022/0254580 A1 | 8/2022 | Zerr | | |

FOREIGN PATENT DOCUMENTS

| | | |
|---|---|---|
| DE | 102021210840 | 3/2023 |
| JP | 03020924 A * | 1/1991 |

OTHER PUBLICATIONS

Author Unknown, Latching Relay I/O Module Holds Output State Upon Power-Down, Brentek, May 8, 2023.

Author Unknown, New Automated Protection Switch by Cornet Technology Boosts Router-based Network Reliability, Business Wire, Jul. 9, 2008.

Author Unknown, RPS-24 (Router Protection Switch), May, 8, 2023.

Xue et al., Nanosecond Optical Switching and Control System for Data Center Networks, Nature Communications, 2022.

* cited by examiner

LOW COST FAIL-2-WIRE CIRCUIT

BACKGROUND OF THE INVENTION

High available (HA) networking devices, such as Ethernet Switches, are designed to provide or otherwise support networking and/or routing capabilities, services, and/or tools even if (as an example) some of the networking devices (as example) lose power. Although high availably techniques and/or systems are available, they are expensive and/or only offer a temporary solution which is insufficient in an extended (e.g., power) outage scenario. New techniques and/or systems which overcome such shortcomings would be desirable.

BRIEF DESCRIPTION OF THE DRAWINGS

Various embodiments of the invention are disclosed in the following detailed description and the accompanying drawings.

DETAILED DESCRIPTION

Figure 1:
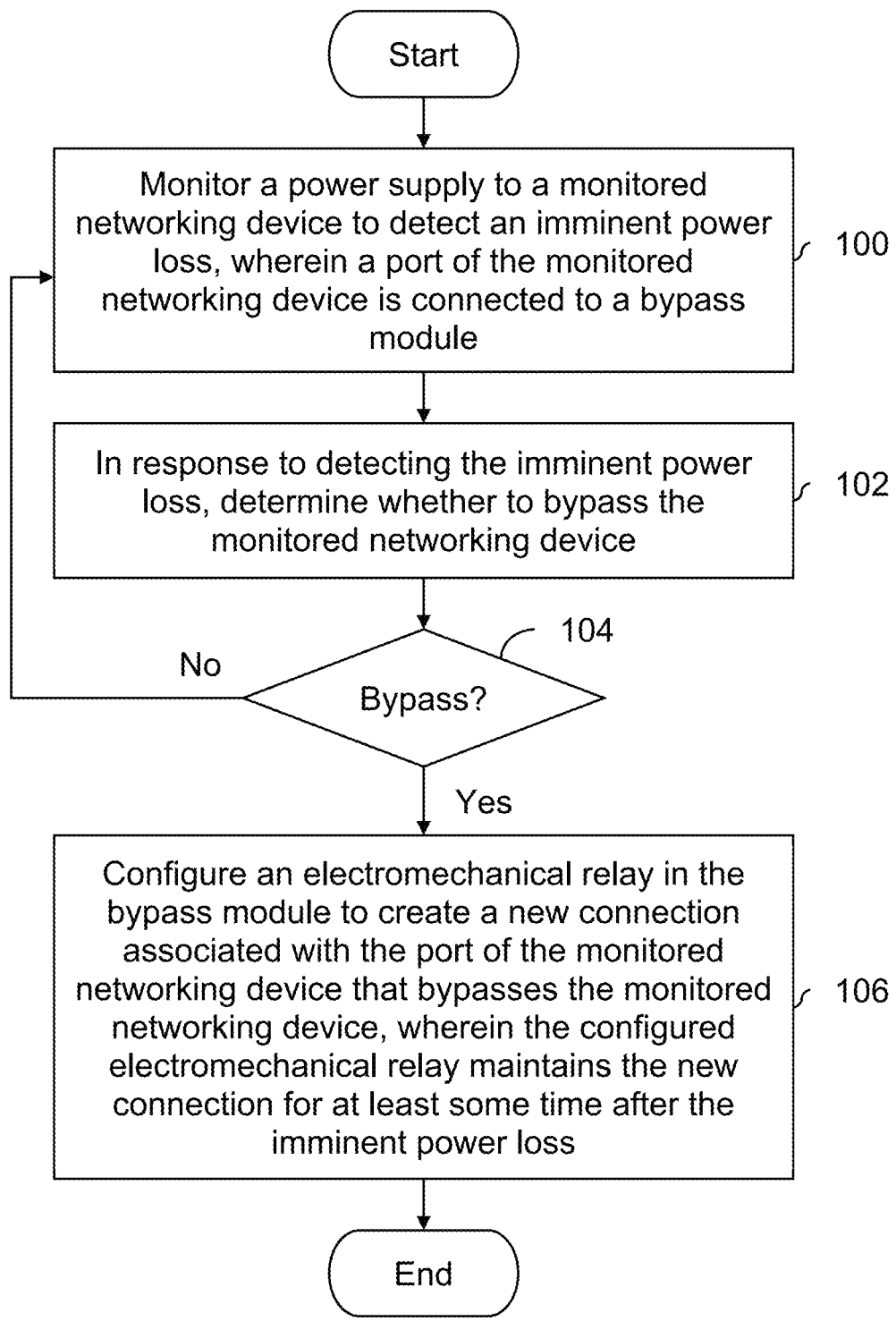
FIG. 1 is a flowchart illustrating an embodiment of a process to create a bypass using one or more electromechanical relays.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques and/or systems associated with creating or forming a bypass (e.g., between ports of a networking device) in response to a detection of a (e.g., imminent) power loss are described herein. Conceptually, the bypass that is formed or otherwise created may be thought of as a wire, and so the techniques described herein may be thought of as a "fail-to-wire" (or, alternatively, "fail-2-wire") technique because in the event of a failure (e.g., the "fail" in the "fail-to-wire"), such as a power loss and/or software failure, a relay or bypass is formed or otherwise created (e.g., the "wire" part of "fail-to-wire") between the signals or ports in a bypass pair (e.g., two Ethernet ports supporting Ethernet speeds of 10, 100, 1000, 2500, 5000 Mbps, etc. in a single or same networking device). Some embodiments of this technique are sometimes referred to herein by the more general terms "bypass module" or "bypass techniques." In some embodiments, the techniques and/or systems are included in a networking device that provides (is characterized by) high availability (HA) service or performance. For example, the fail-to-wire and/or bypass techniques described herein may put networking device(s) (or, more generally, a networked system that includes multiple networking devices) into a predictable and/or known state. The following figure describes one example process that is performed by a bypass module and/or fail-to-wire system.

FIG. 1 is a flowchart illustrating an embodiment of a process to create a bypass using one or more electromechanical relays. In some embodiments, the process of FIG. 1 is performed by a bypass module. In some embodiments, a bypass module is included in a networking device that is connected to the monitored networking device and one or more other networking devices via Ethernet ports and/or RJ45 Ethernet connectors.

At 100, a power supply to a monitored networking device is monitored to detect an imminent power loss, wherein a port of the networking device is connected to a bypass module. For example, the monitored networking device may be receiving traffic (e.g., data, packets, etc.) from some Internet and/or network connection and if the monitored networking device loses power, a bypass will be created that bypasses the monitored networking device (which has lost power and is therefore no longer functional) and forwards the traffic received at the monitored networking device to some other operational networking device.

At 102, in response to detecting the imminent power loss, it is determined whether to bypass monitored networking device. For example, there may be one or more bypass settings that control whether a given electromechanical relay (e.g., in a plurality of electromechanical relays) is connected if an imminent power loss is detected. As will be described in more detail below, in some embodiments, depending upon the mode or role that a monitored networking device is in (e.g., it is an active device or a standby (e.g., backup) device), a bypass enable setting may be set either to TRUE (e.g., it is a standby device) or FALSE (e.g., it is an active device).

In the event it is determined to perform a bypass (104), at 106, an electromechanical relay in the bypass module is configured to create a new connection associated with the port of the monitored networking device that bypasses the monitored networking device, wherein the configured electromechanical relay maintains the new connection for at least some time after the imminent power loss. The new connection is sometimes referred to herein as a bypass. As will be described in more detail below, the (at least partially) mechanical nature of the electromechanical relay allows the new connection (i.e., the bypass) to be maintained (e.g., so that the forwarded traffic is to be forwarded to some other (e.g., operational) networking device) even if the electromechanical relay loses power.

In the event it is determined to not perform a bypass (104), the power supply is (e.g., continued) to be monitored at 100. For example, the step 104 to step 100 branch in the process may be used if the bypass settings indicated no bypass and/or new connection should be created (e.g., the bypass enable setting is set to FALSE).

It may be helpful to illustrate a system that performs the process of FIG. 1. The following figure illustrates one such example system.

Figure 2:
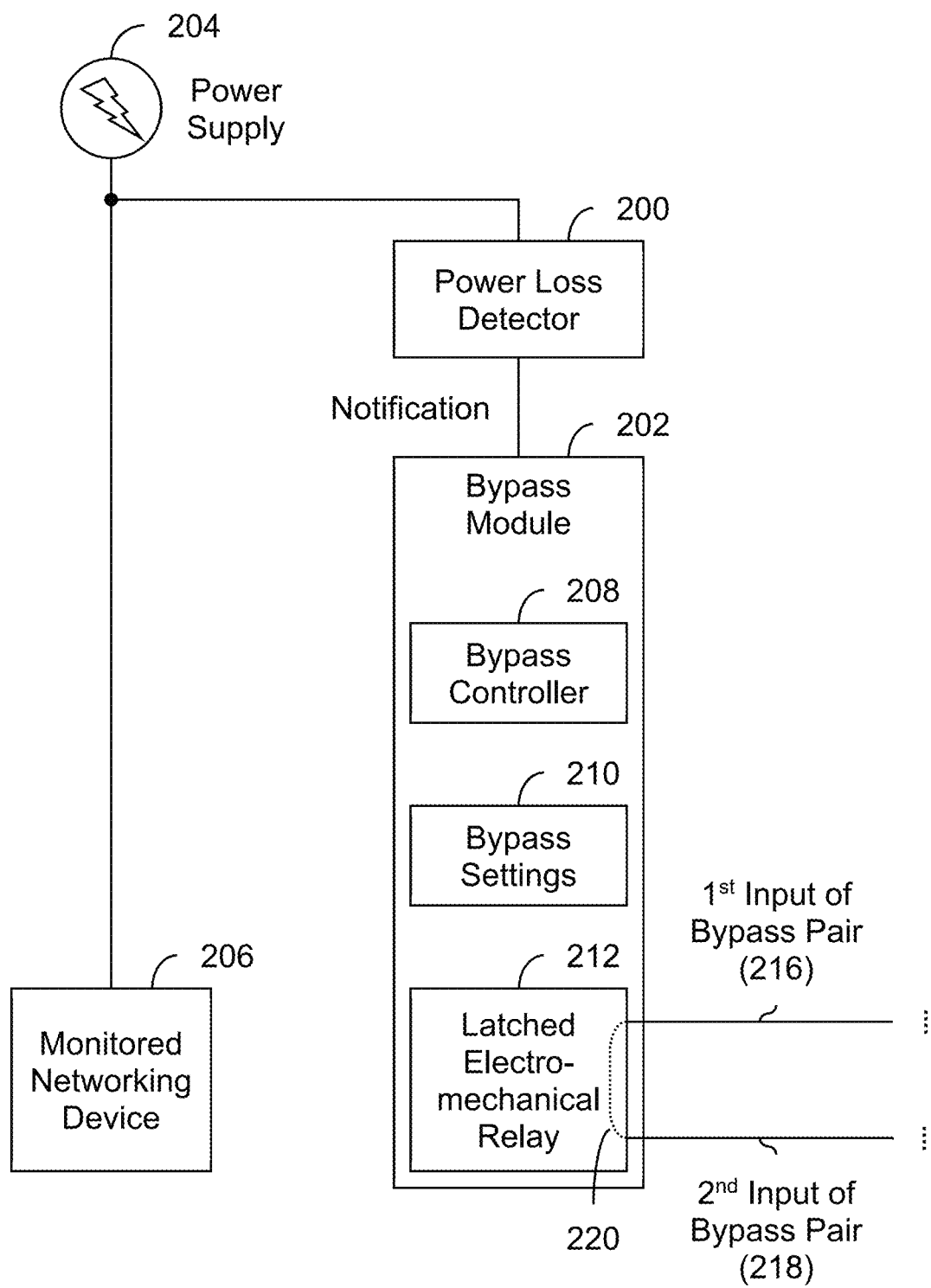
FIG. 2 is a diagram illustrating an embodiment of a power loss detector and bypass module.

FIG. 2 is a diagram illustrating an embodiment of a power loss detector and bypass module. The exemplary power loss detector (200) and bypass module (202) shown here are examples of systems and/or devices which may perform the process of FIG. 1.

In this example, the power loss detector (200) monitors a power supply (204) to a monitored networking device (206). For example, the monitored networking device (206) may be a routing device, a firewall device, etc. and the power supply (204) may be a 12V supply. In this example, the power loss detector (200) continuously monitors the power supply (204) to detect or otherwise identify any imminent (e.g., early, anticipated, etc.) power loss to the monitored networking device (206). The power loss detector (200) in this example includes standard, off-the-shelf component(s) such as an off-the-shelf power monitoring circuit (e.g., a MAX708 chip) which are available from a variety of manufacturers. As will be discussed in more detail below, the exemplary power loss detector (200) is not implemented using an expensive (e.g., backup) battery- or capacitor-powered micro controller to perform the power loss detection. In other words, in at least some embodiments, the technique is implemented using standard power monitoring circuits (e.g., in the power loss detector (200)) and one or more complex programmable logic devices (CPLDs) is/are used to implement the detection mechanism and/or take the action (e.g., the bypass controller (208) is implemented as a CPLD).

If an imminent power loss is detected, the power loss detector (200) sends a notification to the bypass module (202). In response to receiving the notification, the bypass controller (208) accesses the bypass settings (210) and determines (e.g., based on the value(s) stored in register(s) that comprise the bypass settings (210)) whether to create a new connection (i.e., a bypass) between a first input (216) and a second input (218) in a bypass pair. In some embodiments, the bypass pair (216 and 218) are ports or connectors associated with the monitored networking device (206) so that traffic sent to the monitored networking device (206) can be forwarded (e.g., via the net connection and/or bypass (220) and via additional connections, as or if needed) to an operational networking device (not shown) where the traffic to the monitored networking device (206) can be properly handled and/or routed.

The various modules shown in this example may be implemented in a variety of ways. For example, the bypass controller (208) may be implemented using a complex programmable logic device (CPLD), field-programmable gate array (FPGA), application-specific integrated circuit (ASIC), etc.

For simplicity and ease of explanation, suppose that the possible bypass settings (210) are set either to: bypass enable=TRUE (e.g., yes, create a new connection (220) between the bypass pair if an imminent power loss is detected) or bypass enable=FALSE (e.g., no, do not create a new connection between the bypass pair if an imminent power loss is detected).

In this example, suppose that the bypass settings (210) are set to bypass enable=TRUE. In response to receiving the power loss notification from the power loss detector (200), and because bypass enable=TRUE, the bypass controller (208) configures or otherwise sets the latched electromechanical relay (212) to connect the first input (216) and second input (218) of the bypass pair (i.e., the system is in in-bypass). The new bypass or connection (220) created by the latched electromechanical relay (212) may allow operational networking devices in a networked system to bypass the monitored networking device (206) and/or provide networking and/or routing services which the monitored networking device (206) can no longer provide (e.g., at least temporarily).

As is shown in this example, in some embodiments, a bypass module (e.g., 202) (further) includes one or more bypass settings (e.g., 210) which in turn include a bypass enable and determining whether to bypass the monitored networking device is based at least in part on the bypass enable in the one or more bypass settings (e.g., it is a necessary but not sufficient condition for the bypass enable setting to be set to TRUE).

In some embodiments, a more sophisticated set of values and corresponding (e.g., reconfiguration) responses may be supported (e.g., disconnect something using an electromechanical relay and connect something else using another electromechanical relay). For example, after the monitored networking device (206) loses power, one or more of its ports may output "garbage" or unpredictable information. In some embodiments, a bypass module (202) has the ability (e.g., if so configured or enabled) to disconnect or break a connection to a port of the networking device that has lost power (e.g., in addition to and/or as an alternative to creating a new connection or bypass). For example, a latched electromechanical relay may also be put into a disconnected state to (as an example) prevent "bad" or spurious electrical signals from the monitored networking device (206), which has lost power, from being propagated throughout a networked system.

The latching nature of the exemplary latched electromechanical relay (212) requires a pulse (e.g., a pulse HIGH or LOW for a certain amount of time, such as 2 or 3 ms) to mechanically toggle the position of the relay or connection (e.g., from connected to disconnected, or from disconnected to connected), if needed. For example, if the latched electromechanical relay (212) is already in the target or desired configuration or position, then no pulse is applied. Due to the (at least partially) mechanical nature of the latched electromechanical relay (212), the relay or connection will maintain its position even if (or when) there is a loss of power to the latched electromechanical relay (212).

In some embodiments, an electromechanical relay (e.g., 212) is a doubled-winding and latched electromechanical relay where there are two magnetic coils: one for the set signal and the other for the reset signal. In some such embodiments, the input pulse from the bypass controller (208) is applied to the set coil of a doubled-winding and latched electromechanical relay. In HA applications and/or if the ability to ship the product with a deterministic position is an important design consideration, then a doubled-winding and latched electromechanical relay may be desirable over a single-winding and latched electromechanical relay. For example, a single-winding solution has the potential to return to the reset position in the event of a power loss. However, in applications that do not require power loss bypass support, it would be acceptable to have single winding latched relays.

The techniques and/or systems described herein offer a number of benefits and/or advantages (e.g., in general or more specifically over existing backup and/or power loss systems). One benefit is that the (at least partially) mechanical nature of the latched electromechanical relay (212) enables the bypass (e.g., in response to the power loss detection) to be maintained even if the bypass module (202) loses power. For example, the loss of the power supply (204) may also be indicative of an imminent loss of power to the bypass module (202). The latched electromechanical relay (202) does not require a backup power supply to maintain a bypass (e.g., between the bypass pair (216 and 218)). In contrast, some other bypass and/or power loss solutions require an expensive backup power supply, and the bypass is only available (for those other systems) while the backup power supply has power, typically only a few hours or a few days. Recent, extended power grid failures in the United States and elsewhere have shown that it can no longer be assumed that a power grid will be restored within a few hours or even a few days.

For example, suppose that the monitored networking device (206) is part of a software-defined wide area network (SD-WAN) that supports Spoke high availability (HA). To prove or otherwise demonstrate Spoke HA, some other solutions use electrical or optical multiplexers that lose the state (e.g., a connection between a bypass pair), or move to an unpredictable state (e.g., where the state of a connection between a bypass pair is unknown) when the device with the electrical or optical multiplexers loses power. In contrast, the techniques and/or systems described herein can maintain the bypass due to the (at least partially) mechanical nature of the latched electromechanical relay, even if there is no power for an extended period of time.

Another benefit to the techniques and/or systems described herein is that the power loss detector (200) is implemented (at least in some embodiments) using inexpensive components. For example, some other power loss detectors use battery- and/or capacitor-powered microcontrollers (i.e., processors) that can detect a power loss scenario, but if the power drains (e.g., from the battery or capacitor), the microcontroller goes into an unpredictable state. These other types of implementations are expensive (e.g., because of the battery and/or capacitor, as well as the micro controller) and take up significant printed circuit board (PCB) space but are unusable once the battery or capacitor is drained. In contrast, the power loss detector (200), at least in the example of FIG. 2, does not use a battery- and/or capacitor-powered microcontroller and therefore does not have the associated drawbacks.

Another benefit of the techniques described herein is that they are compatible with and/or usable in scenarios where some of the networking devices in the system are hardened (e.g., for device and/or network security) and/or difficult to access (e.g., physically). For example, the Ethernet PHY (302) and/or NIC/switch (304) shown in FIG. 3 may be hardened network devices and/or difficult to access, but the inclusion of a bypass module and/or bypass features (e.g., including latched electromechanical relays (300)) in a more accessible device and/or one that is not hardened may permit bypass capabilities even with hardened and/or difficult to access networking devices in the system.

The example of FIG. 2 describes a single latched electromechanical relay (212), but in some other embodiments, a bypass controller (e.g., 208) manages multiple latched electromechanical relays and the bypass settings (e.g., 210) includes multiple, independent settings or registers for the multiple latched electromechanical relays. The following figure shows one such example.

Figure 3:
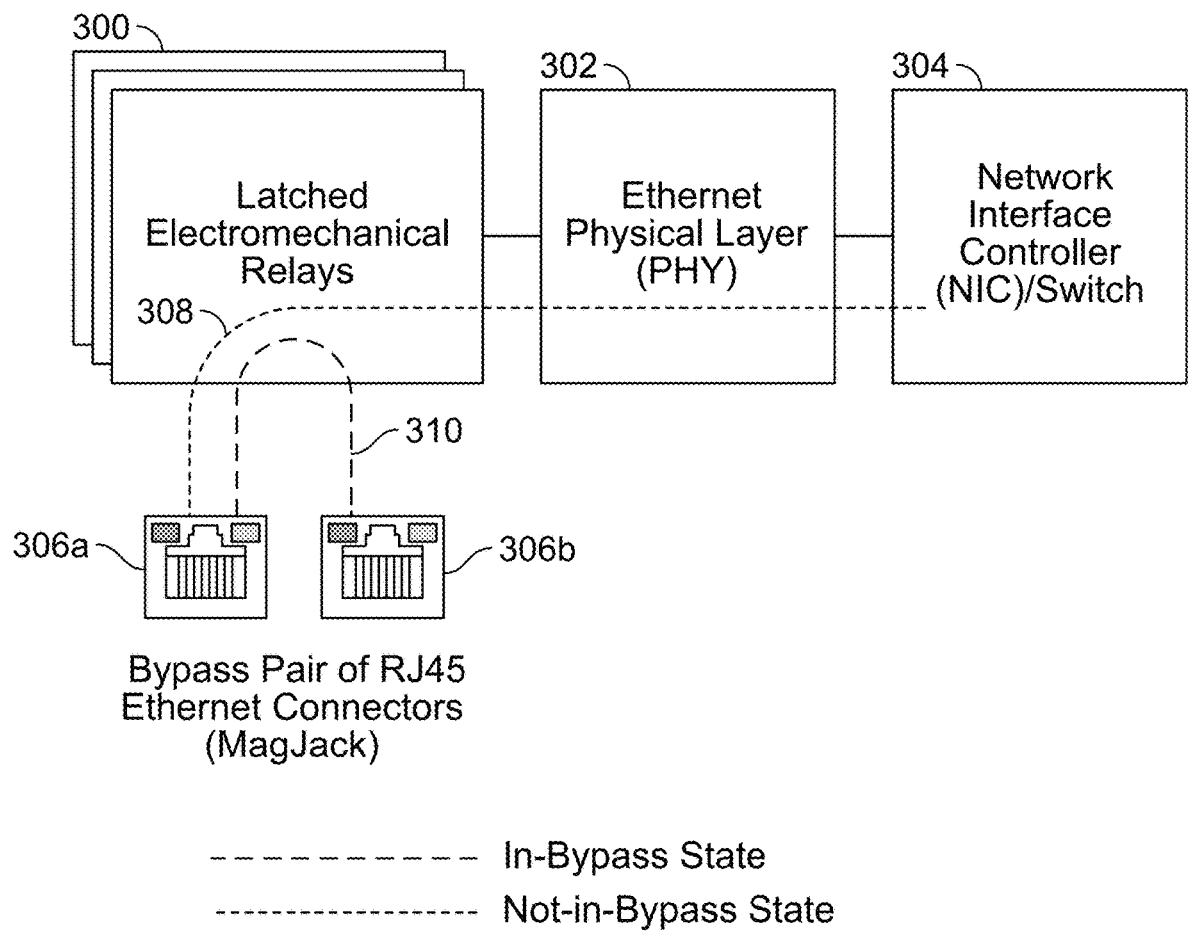
FIG. 3 is a diagram illustrating an embodiment of a plurality of latched electromechanical relays that connect a bypass pair of RJ45 Ethernet connectors when in a bypass state.

FIG. 3 is a diagram illustrating an embodiment of a plurality of latched electromechanical relays that connect a bypass pair of RJ45 Ethernet connectors when in a bypass state. To preserve the readability of this figure, some components or modules described in other examples (e.g., the power loss detector) are not shown in this example.

In this example, there is a plurality of latched electromechanical relays (300). When the latched electromechanical relays (300) are not in a bypass state or mode (e.g., because a power loss detector (not shown) has not signaled or otherwise indicated a (e.g., imminent) power loss), the latched electromechanical relays (300) are in a state or configuration that supports (or, at a minimum, is not incompatible with) a not-in-bypass connection (308) where a first RJ45 Ethernet connector (306a), sometimes referred to as a MagJack, in a bypass pair is connected to an Ethernet physical layer (PHY) (302) which in turn is connected to a network interface controller (NIC) and/or switch (304). For example, this may be how the connectors and devices are connected during a normal or regular operational mode.

When the latched electromechanical relays (300) are in a bypass state or mode (e.g., because a power loss detector (not shown) has indicated a (e.g., imminent) power loss), the new connection and/or bypass supports or is part of an in-bypass connection (310) where the first RJ45 Ethernet connector (306a) in the bypass pair is connected to the second RJ45 Ethernet connector (306b) in the bypass pair instead of the Ethernet PHY (302).

In some embodiments, there are multiple latched electromechanical relays and/or multiple bypass pairs. In some embodiments, more complex and/or sophisticated relays or connections may be supported beyond a two-input, bypass pair. For example, there may be a bypass triplet where various connections between any number of the three inputs are supported in the event of a power loss; all three inputs are connected, inputs 1 and 2 are connected and input 3 is not connected to the other two, and so on.

As shown in this example, in some embodiments, creating a new connection (e.g., at 106 in FIG. 1) includes creating the new connection between a (e.g., first) port of the monitored networking device (e.g., 306a) and a second port of the monitored networking device (e.g., 306b). In some such embodiments, the (e.g., first) port and second port are associated with one or more of the following: an Ethernet port or an RJ45 Ethernet connector.

Returning briefly to FIG. 2, in some embodiments, a power loss detector (200) and bypass module (202) are incorporated into some networking devices. The following figures illustrate some examples of this where a power loss detector (e.g., 200) and bypass module (e.g., 202) are part of a local area network (LAN) switch.

Figure 4A:
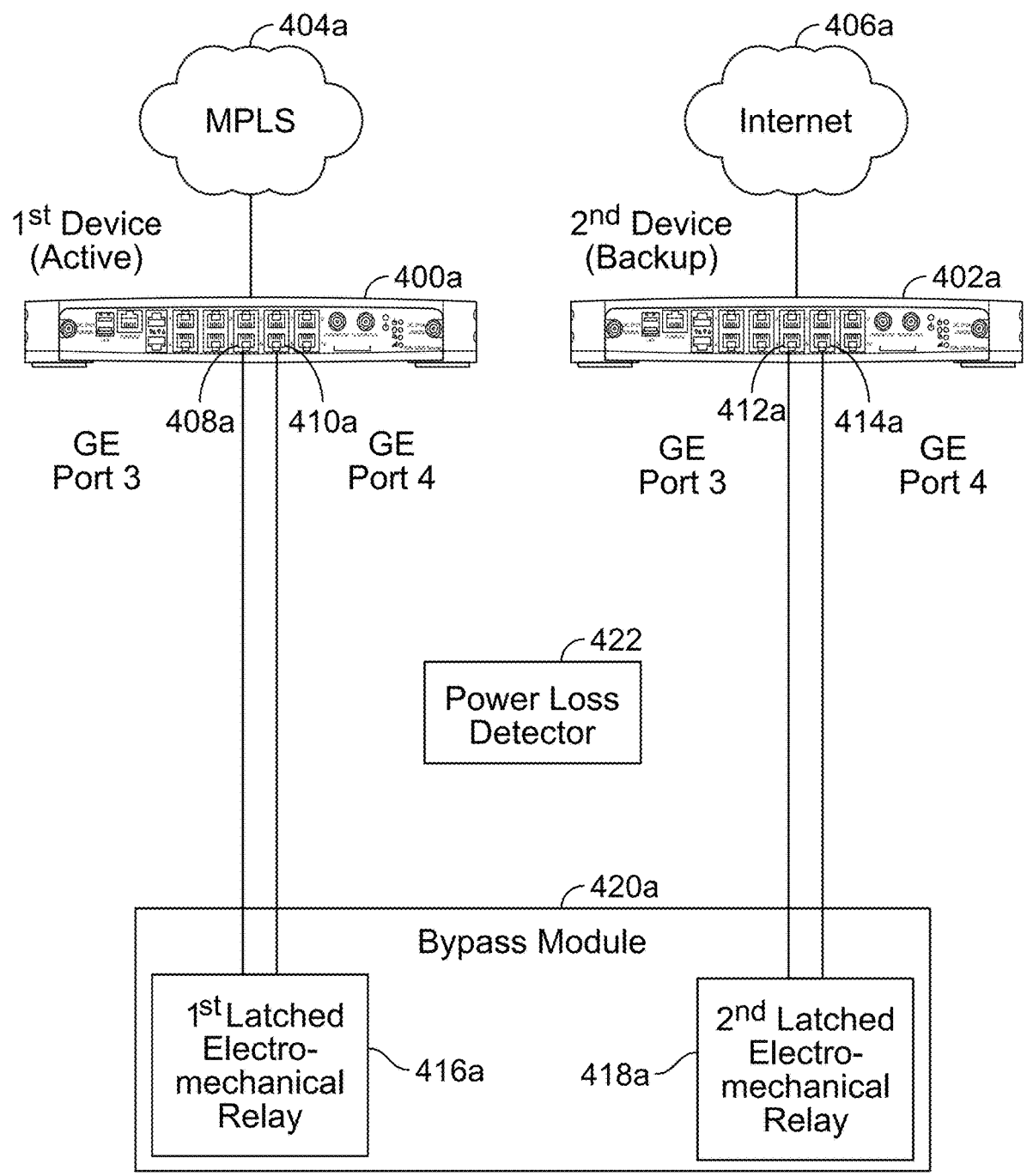
FIG. 4A is a diagram illustrating an embodiment of an active device and a standby device associated with a software-defined wide area network (SD-WAN).

FIG. 4A is a diagram illustrating an embodiment of an active device and a standby device associated with a software-defined wide area network (SD-WAN). In this example, there is a first (networking) device (400a), which is the active device, and a second (networking) device (402a), which is the standby device, at least in the state shown here. The active device (e.g., 400a) is so named because it is actively performing operations, such as session creation, inspection, providing quality of service (QOS) services, etc. The standby device (e.g., 402a) does not actively perform the operations described above. Rather, the standby device (e.g., 402a) monitors and records the sessions and connections (e.g., created and managed by the active device (400a)), but the standby device doesn't do any active or actual forwarding of traffic.

In this example, the first device (400a) has a data and/or Internet connection, in this example a multiprotocol label switching (MPLS) connection (404a), for example, associated with a first Internet or network provider, such as AT&T. The second device (402a) has its own data and/or Internet connection (406a) that is independent of the MPLS connection (404a) associated with the active device (400a), for example, associated with a second Internet or network provider, such as Verizon. In various embodiments, the data and/or Internet connections (e.g., 404a and 406a) that the first and second devices (400a and 402a) use may comprise a variety of networking and/or communications protocols or technologies, such as a cellular data connection, MPLS connection, a cable modem connection, a digital subscriber line (DSL) connection, a fiber optic cable connection, etc. As shown in this example, the connections and/or networks (404a and 406a) that the networking devices (400a and 402a) are connected to do not need to be the same type of connection and/or network.

In some embodiments, the power loss detector (422) and bypass module (420a) are located in the first (e.g., active) device (400a) where the bypass pair would then be connected internally (e.g., inside the case or box). In some embodiments, the power loss detector (422) and bypass module (420a) are located in the second (e.g., backup) device (402a). It is noted that the configurations and/or embodiments are independent of each other and so the inclusion of a power loss detector (e.g., 422) and bypass module (e.g., 420a) in one networking device does not necessarily preclude another networking device from having its own power loss detector (e.g., 422) and bypass module (e.g., 420a).

The first device (400a) and second device (402a) have multiple Ethernet ports. In this example, Ethernet port 3 and Ethernet port 4 (408a and 410a) from the first device (400a) form one bypass pair (e.g., associated with a first latched electromechanical relay (416a)) and Ethernet port 3 (412a) and Ethernet port 4 (414a) from the second device (402a) form another bypass pair (e.g., associated with a second latched electromechanical relay (418a)). In this example, the two latched electromechanical relays (416a and 418a) are included in a bypass module (420a). To preserve the readability of the figure, some modules in the bypass module which were previously described (e.g., the bypass controller and bypass settings described in FIG. 2) are not shown in this figure.

Each device (400a and 402a) receives traffic from its respective network connection (404a and 406a) and is responsible for routing or otherwise managing that traffic. In this example, the second device (402a) loses power and the traffic from its Internet connection (406a) must be forwarded to the first device (400a) for routing and/or servicing which the second device (402a) will soon be unable to provide. For clarity and readability, the example continues in the following figure, showing more detailed information associated with the state of the exemplary system (e.g., before the power loss is detected and responded to).

Figure 4B:
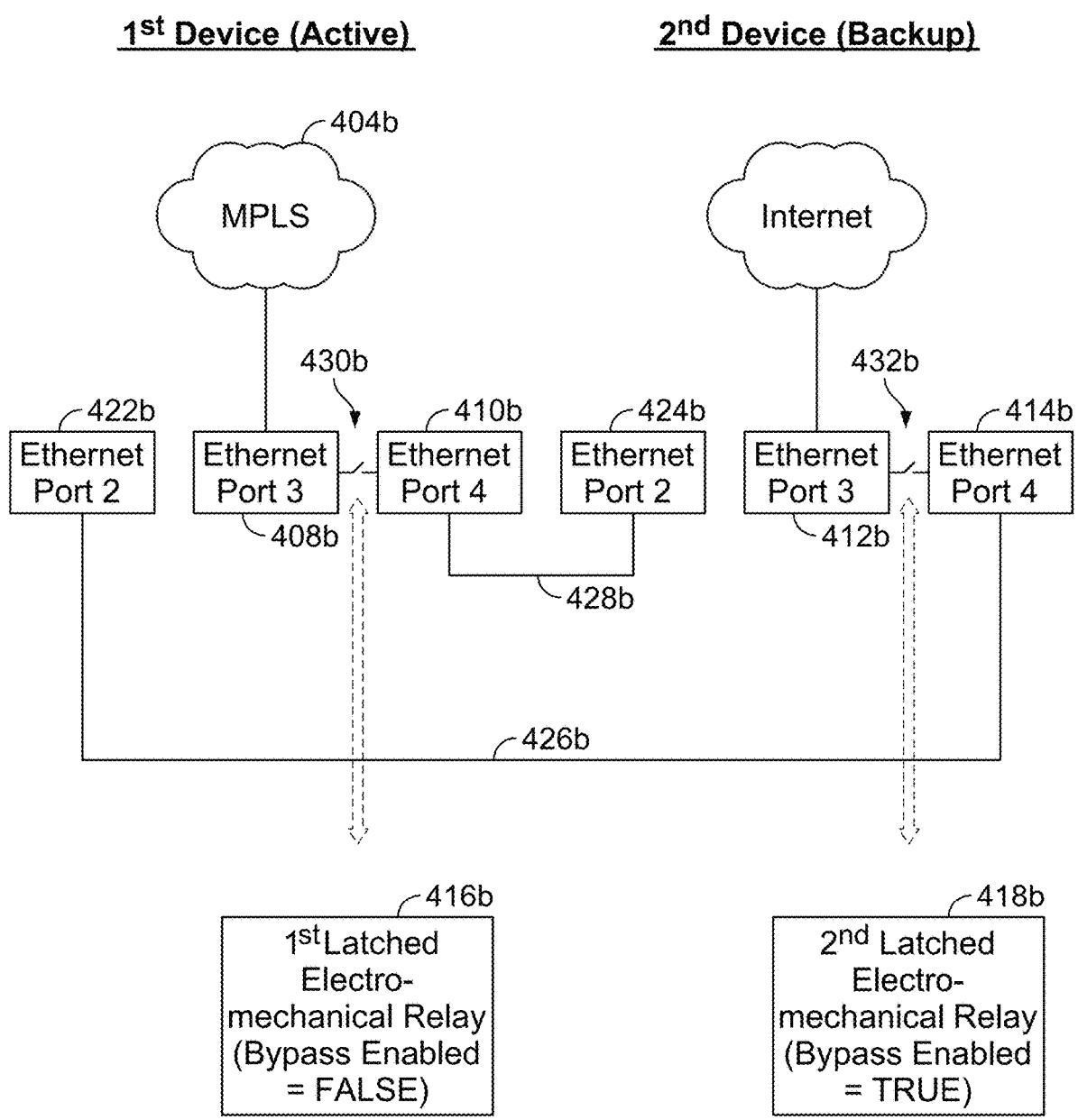
FIG. 4B is a diagram illustrating an embodiment of an active device and a standby device, including additional Ethernet ports that are not managed by a bypass module.

FIG. 4B is a diagram illustrating an embodiment of an active device and a standby device, including additional Ethernet ports that are not managed by a bypass module. FIG. 4B continues the example of FIG. 4A, showing the same state as that shown in FIG. 4A (e.g., before the power loss is detected and responded to). For clarity and readability, some elements shown in FIG. 4A are excluded in this figure (e.g., the power loss detector (422), etc.). To provide more information, additional elements (not shown in FIG. 4A) have been added (e.g., Ethernet ports 2 (422b and 424b)).

At left, three ports of the first device (in this example, the active device) are shown: Ethernet port 2 (422b), Ethernet port 3 (408b), and Ethernet port 4 (410b). Ethernet port 3 (408b) is connected to the MPLS network and/or connection (404b). At right, three ports of the second device (in this example, the standby device) are shown: Ethernet port 2 (424b), Ethernet port 3 (412b), and Ethernet port 4 (414b). Ethernet port 2 (422b) of the first device is connected (426b) to Ethernet port 4 (414b) of the second device. Similarly, Ethernet port 2 (424b) of the second device is connected (428b) to Ethernet port 4 (410b) of the first device.

Returning to FIG. 4B, in the state shown here, the power loss to the second (backup) device has not yet occurred. In this example, the first latched electromechanical relay (416b) associated with the first (active) device has the bypass enabled (setting) set to FALSE. As such, the associated connection or relay (430b) between Ethernet port 3 (408b) and Ethernet port 4 (410b), at left, will remain open (i.e., disconnected) and will not be closed (i.e., connected), even if a monitored networking device loses power. Ethernet port 3 (408b) and Ethernet port 4 (410b) are one example of a bypass pair.

The second latched electromechanical relay (418b) associated with the second (backup) device does have its bypass enabled (setting) set to TRUE. As such, the connection or relay (432b) between Ethernet port 3 (412b) and Ethernet port 4 (414b), at right, will be connected if or when the exemplary power loss to the monitored device (in this example, the second device) is detected. Ethernet port 3 (412b) and Ethernet port 4 (414b) are another example of a bypass pair. The following figure shows the system after the power loss is detected and the second latched electromechanical relay (418b) has been pulsed.

Figure 4C:
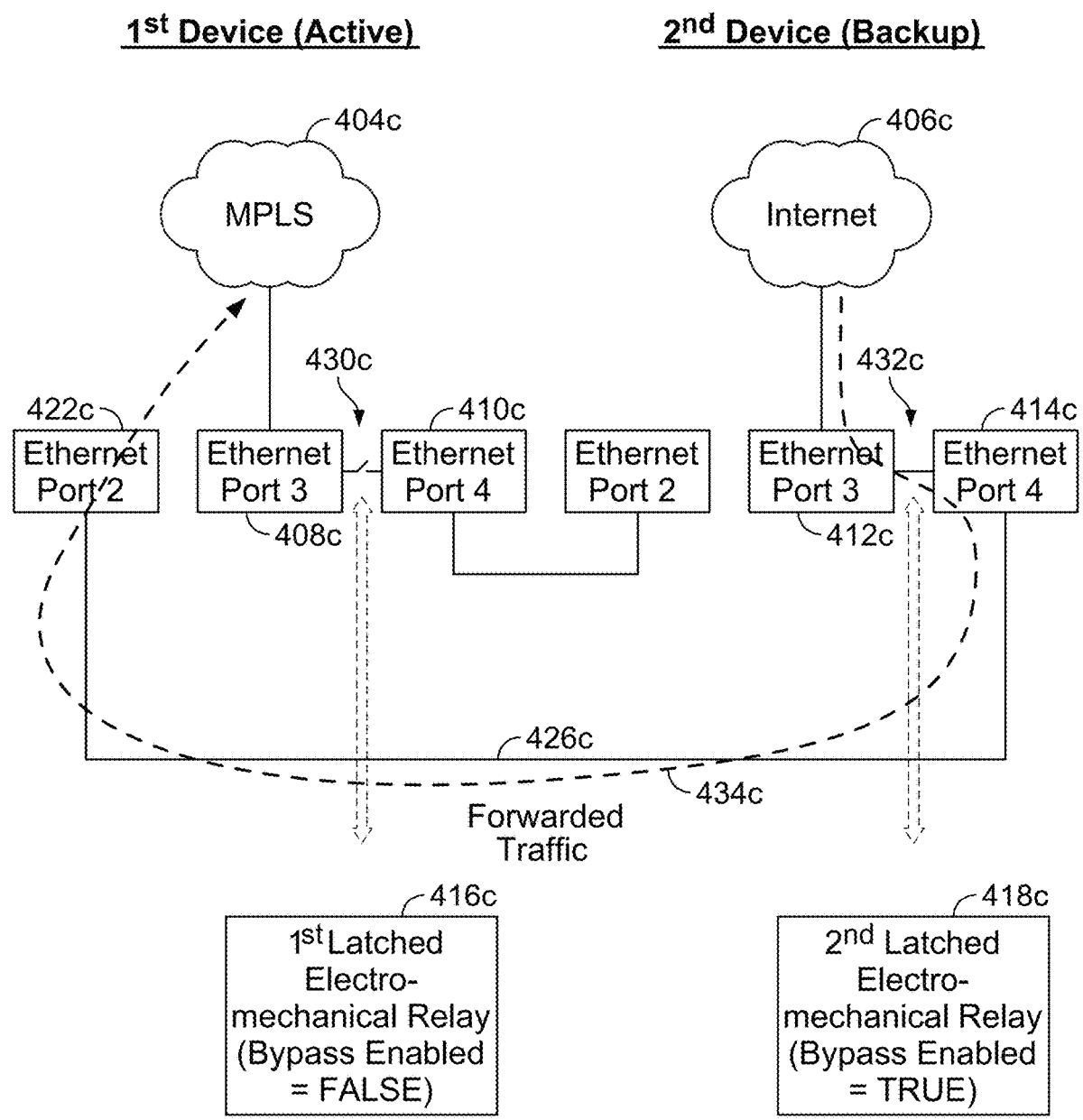
FIG. 4C is a diagram illustrating an embodiment of an active device and a standby device, after a power loss has been detected.

FIG. 4C is a diagram illustrating an embodiment of an active device and a standby device, after a power loss has been detected. In this example, in response to a power loss being detected (e.g., to the second device) and to the bypass enabled (setting) being set to true (see 418c), the second latched electromechanical relay (418c) is pulsed (e.g., by a bypass controller) so that the previously open connection (see, e.g., 432b in FIG. 4B) between Ethernet port 3 (412c)

and Ethernet port 4 (414c) of the second device is now closed or otherwise connected (see, e.g., 432c in FIG. 4C).

The bypass (e.g., at 432c) allows traffic from the Internet connection (406c) to be forwarded (434c) to the first device and/or to be forwarded on the MPLS network (404c), as or if needed. More specifically, the forwarded traffic goes through Ethernet port 3 (412c) in the second device (which has lost power), bypass (432c), Ethernet port 4 (414c) in the second device (which has lost power), connection 426c, Ethernet port 2 (422c) in the first device, and MPLS network (404c). The bypass (432c) can be enabled or configured in a few milliseconds, providing minimal service interruptions and/or satisfying HA requirements.

In contrast, the first latched electromechanical relay (416c) is not enabled so the connection (430c) between Ethernet port 3 (408c) and Ethernet port 4 (410c) remains the same (i.e., open).

It is noted that active devices can become standby devices (e.g., because software or firmware on the networking device "hangs," enters an error or erroneous state, etc.) and the standby device can become the active device. In some such embodiments, latched electromechanical relay(s) associated with a standby device have their bypass setting enabled (see, e.g., 418b and 418c) and latched electromechanical relay(s) associated with an active device have their bypass setting disabled (see, e.g., 416b and 416c) and as those states change (i.e., which networking device(s) is/are active and which one(s) is/are backups), the settings are updated accordingly.

As is shown in the example of FIGS. 4A-4C, in some embodiments, a bypass module (e.g., 202 in FIG. 2) (further) includes one or more bypass settings (e.g., 210 in FIG. 2) which in turn include a bypass enable that is set to TRUE in the event the monitored networking device is associated with a standby device in a software-defined wide area network (SD-WAN) (see, e.g., 418b/c in FIGS. 4B and 4C) and is set to FALSE in the event the monitored networking device is associated with an active device in the SD-WAN (see, e.g., 416b/c in FIGS. 4B and 4C) and determining whether to bypass the monitored networking device is based at least in part on the bypass enable in the one or more bypass settings.

In some embodiments, latched electromechanical relays (e.g., 416b/c or 418b/c) are pulsed or otherwise re-configured as the state of the system changes. For example, once power is restored to the second device, the second latched electromechanical relay (418c) can be pulsed (e.g., by a bypass controller) so that the bypass (432c) is disconnected and the traffic from the Internet connection (406c) can be handled by the second device (now power up and operational again) instead of forwarding the traffic to the first device for handling.

Similarly, as networking devices in the system change states from active to backup (or vice versa), latched electromechanical relays can be pulsed or otherwise reconfigured as needed. To put it more generally, the latched electromechanical relays may be used for a variety of purposes and/or at various times, not just power loss scenarios or HA applications. For example, latched electromechanical relays may be configured so that "out of the box" and/or powered-off networking devices are in a known and/or predictable state or configuration.

The following figures illustrate another example application where a bypass is used to forward traffic to a third-party networking device.

Figure 5A:
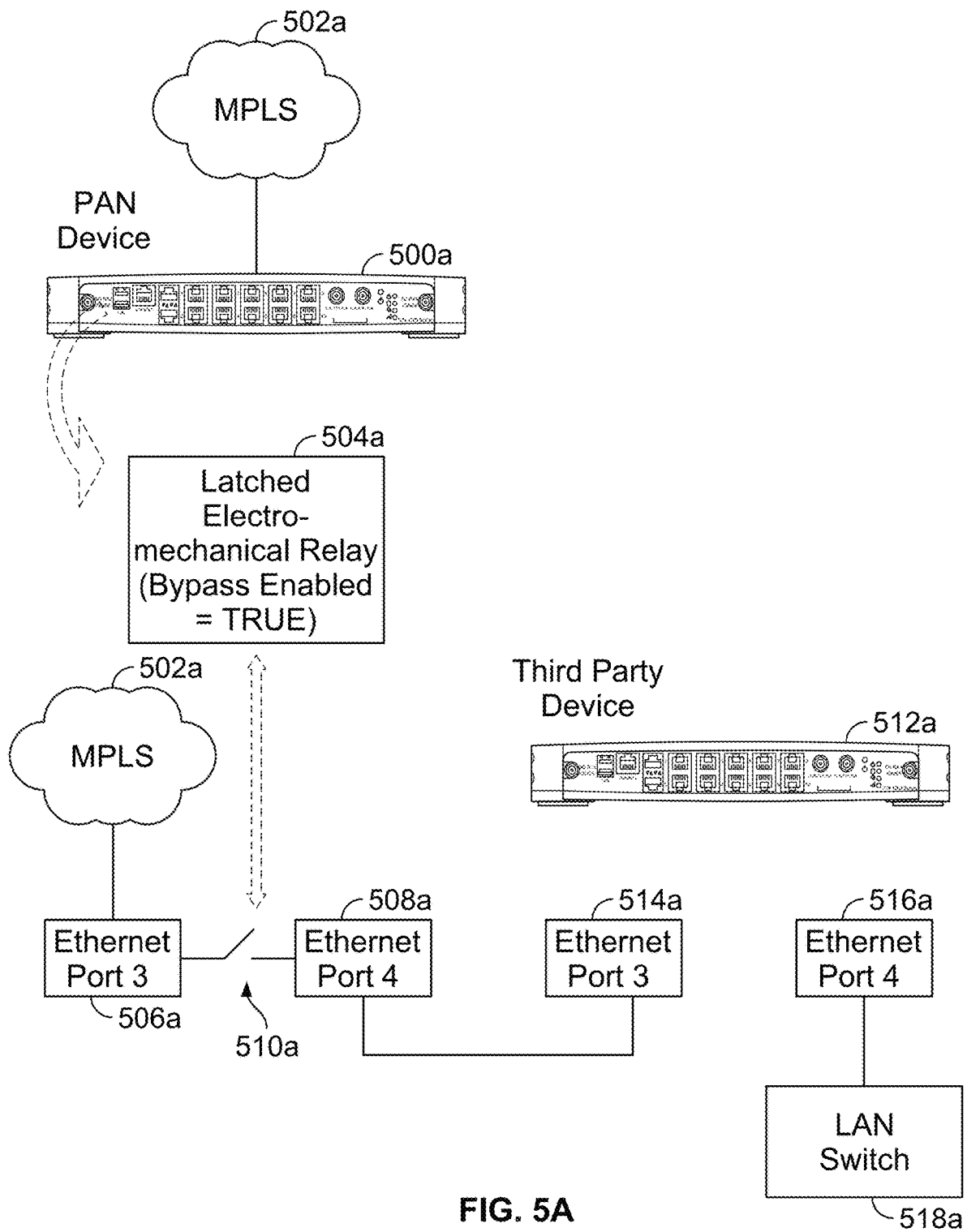
FIG. 5A is a diagram illustrating an embodiment of a bypass that is used to forward traffic to a third-party networking device.

FIG. 5A is a diagram illustrating an embodiment of a bypass that is used to forward traffic to a third-party networking device. In this example, a simpler version of the previous example (described in FIGS. 4A-4C) is shown where there is no active versus bypass role or designation to the exemplary devices. At left, a personal area network (PAN) device (500a) is shown which is connected to an MPLS connection or network (502a) via its Ethernet port 3 (506a). In this example, the PAN device (500a) includes a latched electromechanical relay (504a) which controls a bypass pair comprising Ethernet port 3 (506a) and Ethernet port 4 (508a) of the PAN device (500a). In the state shown here, latched electromechanical relay (504a) has its bypass enabled setting set to TRUE, but a power loss has not yet been detected, so the bypass or connection (510a) between the bypass pair (506a and 508a) is not closed or connected in the state shown here.

At right, a third-party (e.g., networking) device (512a) is shown with Ethernet port 3 (514a) and Ethernet port 4 (516a) where the Ethernet port 4 (516a) is connected to a LAN switch (518a). For example, the third-party manufacturer of the third-party device (512a) may be a company other than the company that manufactured the PAN device (500a). Since the device at right (512a) is a third-party device, it does not include the bypass features and/or techniques described herein and Ethernet port 3 (514a) and Ethernet port 4 (516a) of the third-party device (512a) are not considered or referred to as a bypass pair. Ethernet port 4 (508a) of the PAN device (500a) and Ethernet port 3 (514a) of the third-party device (512a) are connected.

The following figure shows the state of the exemplary system after a (e.g., imminent) power loss is detected (e.g., by a power loss detector (not shown) located on the PAN device (500a)) and after the latched electromechanical relay (500a) is pulsed or otherwise reconfigured, in response.

Figure 5B:
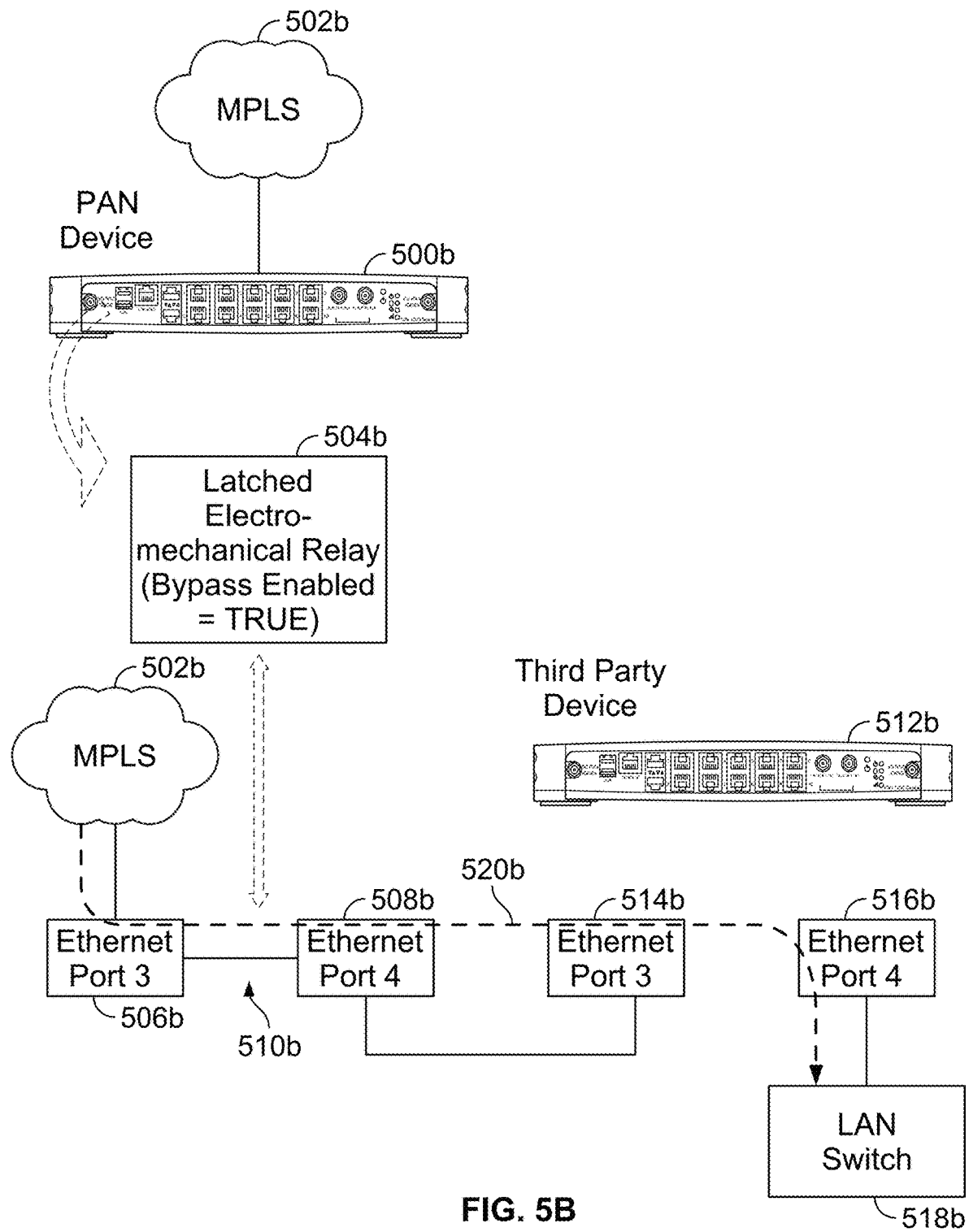
FIG. 5B is a diagram illustrating an embodiment of a bypass that is used to forward traffic to a third-party networking device, where the latched electromechanical relay is in an in-bypass state.

FIG. 5B is a diagram illustrating an embodiment of a bypass that is used to forward traffic to a third-party networking device, where the latched electromechanical relay is in an in-bypass state. In the state shown here, a power loss has been detected in or at the PAN device (500b) and the latched electromechanical relay (504b) in the PAN device (500b) was pulsed (e.g., while there was still sufficient power) so that a (new) connection (510b) is created between Ethernet port 3 (506b) and Ethernet port 4 (508b) of the PAN device (500b) This allows traffic from the MPLS network (502b) to bypass the now non-functional PAN device (500b) and be rerouted (520b) through the Ethernet port 3 (506b) and Ethernet port 4 (508b) of the PAN device (500b) and Ethernet port 3 (514b) and Ethernet port 4 (516b) of the third-party device (512b) and on to the LAN switch (518b).

In some applications, some enterprise systems have switches from different vendors (e.g., third-party device (512a/b)). Such devices may not (e.g., inherently and/or on their own) offer the bypass capability shown in this example. With the bypass features and/or components (e.g., 504b) in the PAN device (500b), bypass capability can be supported or otherwise provided, even with third-party vendors and/or networking devices that were designed for bypass capabilities.

As is shown in this example, in some embodiments, data is forwarded (e.g., 520b) via the new connection that is created (e.g., 510b) to a third-party networking device (e.g., 512b).

Returning briefly to FIG. 1, in some embodiments, some other check feeds into the bypass branch or decision at 104. The following figure describes an example process to create a bypass, including in response to a watchdog timer.

Figure 6:
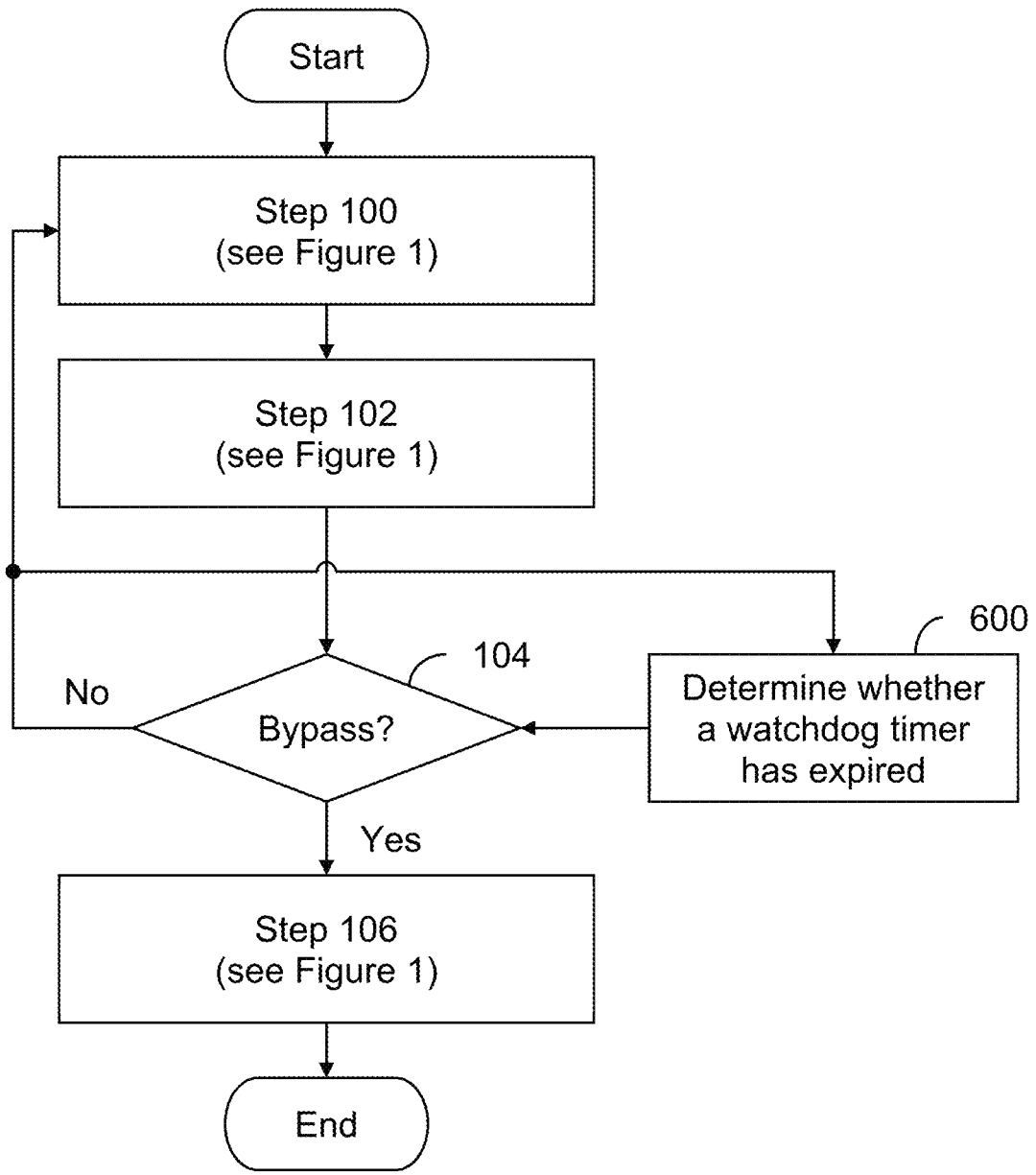
FIG. 6 is a flowchart illustrating an embodiment of a process to create a bypass using one or more electromechanical relays, including based on a watchdog timer.

FIG. 6 is a flowchart illustrating an embodiment of a process to create a bypass using one or more electromechanical relays, including based on a watchdog timer. The example process of FIG. 6 is similar to FIG. 1 and for brevity, steps that were previously described in the discussion of FIG. 1 (e.g., steps 100, 102, 104, and 106) are not repeated herein.

In this example, at 600, it is determined whether a watchdog timer has expired. For example, the watchdog timer may be used to detect if software and/or firmware running on a monitored device has "frozen" and/or has stopped running. Returning briefly to FIG. 2, in one example, the bypass settings (210) include a setting associated with enabling (or not) a watchdog timer, as well as a corresponding value or threshold of that watchdog timer (if enabled). The watchdog timer threshold is set to a (e.g., relatively) large value, where the software and/or firmware is not expected to be idle or silent for that long. For example, the watchdog timer may start at the specified non-zero value in the settings and count down; each time a software and/or firmware operation or instruction is detected, the watchdog timer is reset to the non-zero value and the decrementing begins again. The watchdog timer expires if the value ever hits zero.

The following table illustrates an example of some example scenarios showing various combinations of bypass settings (including watchdog related settings) and system states and the resulting bypass state.

TABLE 1

Example combinations of bypass settings (including watchdog related settings) and system states and the resulting bypass state.

| Bypass Setting | System State | Bypass State (i.e., Resulting State of Latched Electromechanical Relay(s)) |
|---|---|---|
| Bypass enabled = FALSE (i.e., Disabled) | Power off | Not-in-Bypass |
| Bypass enabled = FALSE (i.e., Disabled) | Power on; software and/or firmware is running | Not-in-Bypass |
| Bypass enabled = TRUE (i.e., Enabled) | Power on; software and/or firmware is running; no watchdog timer enabled | Not-in-Bypass |
| Bypass enabled = TRUE (i.e., Enabled) | Power on; watchdog timer is enabled and has expired (i.e., software and/or firmware is not running properly) | In-Bypass |
| Bypass enabled = TRUE (i.e., Enabled) | Power off | In-Bypass |

Returning to the exemplary flowchart shown in FIG. 6, the determination at 600 about whether a watchdog timer has expired feeds into the bypass decision or fork at 104 (at least in some embodiments). If the bypass decision at 104 is "Yes," then the process goes to step 106, as described above. If the bypass decision at 104 is "No," then the process checks or otherwise determines (e.g., again) if the watchdog timer has expired at 600 and also returns to step 100. As shown in the table above, the expiration of the watchdog timer (600) is sufficient to trigger a bypass (i.e., the "Yes" fork of the bypass decision at 104), even if the power is still on (at least in some embodiments).

As is shown in this example, in some embodiments, a bypass module (e.g., 202 in FIG. 2) (further) includes one or more bypass settings (e.g., 210 in FIG. 2) which in turn include: (1) a bypass enable (see, e.g., Table 1) and (2) a watchdog timer value (see, e.g., Table 1); and determining whether to bypass the monitored networking device is based at least in part on: (1) the bypass enable in the one or more bypass settings and (2) a determination whether a watchdog timer associated with the watchdog timer value in the one or more bypass settings has expired (see, e.g., FIG. 6).

Returning briefly to FIG. 2, depending upon the platform and/or implementation, the power supply (204) may have different characteristics and the power loss detector (200) may be tuned accordingly. The following figure describes one such example of this.

Figure 7:
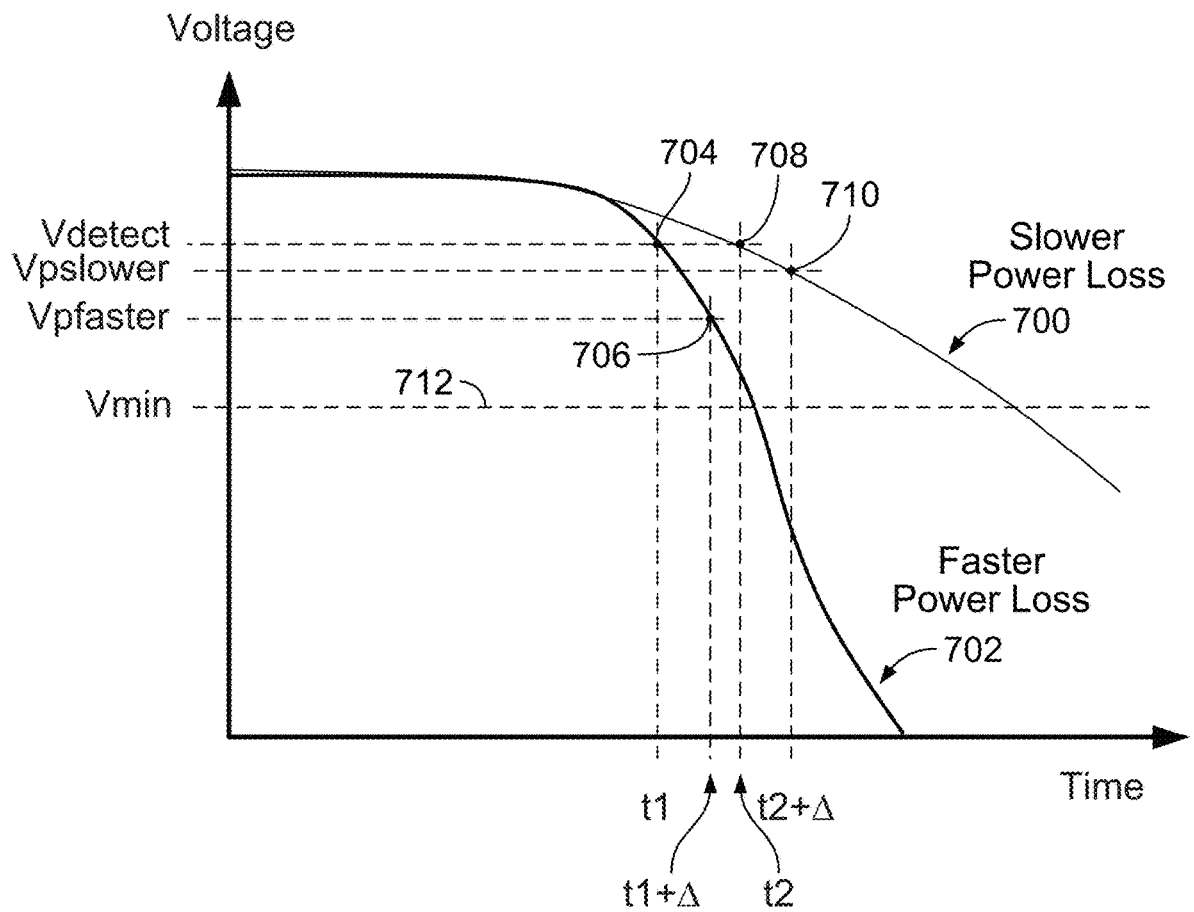
FIG. 7 is a graph illustrating an embodiment of two power loss functions.

FIG. 7 is a graph illustrating an embodiment of two power loss functions. In this example, the graph shows time along the x-axis and voltage along the y-axis. Two exemplary power loss functions are shown: a slower power loss function (700) and a faster power loss function (702). For example, depending upon the platform and/or implementation, some monitored networking devices may have multiple power sources, resulting in a slower rate of voltage loss over time (see, e.g., 700). In contrast, a monitored networking device with only a single power source may lose power much more quickly (see, e.g., 702).

In this example, suppose that a power loss detector (e.g., 200 in FIG. 2) is configured to signal or otherwise flag a (e.g., imminent) power loss if the power supply (e.g., measured from 700 or 702) drops below Vdetect. The graph shown here corresponds to a faster detection point (704) for the faster power loss function (702) at time t1 and voltage Vdetect. For the slower power loss function (700), detection occurs at slower detection point (708) at time t2 and voltage Vdetect.

In this example, $\Delta$ includes decision-making time (e.g., whether to create a bypass and/or new connection, and if so, which electromechanical relays to pulse) between the power loss detection (e.g., times t1 and t2) and just prior to pulsing the appropriate electromechanical relays. Therefore, the time at which pulsing would occur is (t1+$\Delta$) and (t2+$\Delta$), respectively.

The voltages when pulsing would occur for the slower power loss function (700) and the faster power loss function (702) are Vpslower and Vpfaster (see, e.g., faster pulse point (706) and slower pulse point (710)) where Vpslower>Vpfaster. The minimum voltage that is required to be available in order to sufficiently and/or properly pulse the appropriate electromechanical relays is Vmin (712) where Vpslower»Vmin and Vpfaster>Vmin. In other words, the slower power loss function (700) has a much larger voltage margin relative to the minimum voltage (Vmin) compared to the faster power loss function (702) when the same detection voltage (Vdetect) is used. This permits the voltage used for detection to be tuned based on the rate of power loss for a given implementation and/or platform. For example, a lower detection voltage (Vdetect) may be used for slower power loss functions (e.g., similar to 700) whereas a higher detection voltage (Vdetect) is used for faster power loss functions (e.g., similar to 702). This balances the desire for a sufficient voltage to accomplish the pulsing of the electromechanical relays against the reduction of false positive power loss detection events (e.g., due to a spurious drop in the voltage level of the power supply that is not an actual power loss event).

In some embodiments, during the design phase, an appropriate and/or desirable detection voltage is identified and stored for use during a power loss detection process. For example, the power loss detector (200) in FIG. 2 may include settings and/or registers that store the detection voltage (Vdetect) and that stored value is used to trigger a power loss notification (e.g., sent from the power loss detector (200) to the bypass module (202) in FIG. 2). In some embodiments, generalized detection voltages are defined and stored for certain classes, groups, or types of networking devices and/or power supply implementations or platforms. For example, this may make it faster and/or simpler than calibrating the power loss detector for many different networking devices. For example, enterprise class networking devices may have more robust power supplies with slower power loss rates whereas non-enterprise class networking devices may have faster power loss rates and there could be a stored enterprise voltage detection value and a stored non-enterprise voltage detection value.

As is shown in this example, in some embodiments, detecting an imminent power loss is based at least in part on a setting associated with a detection voltage. For example, the setting may be a customized value that is specifically tuned or calibrated for a specific monitored networking device. In some other embodiments, the settings may include pre-defined detection voltages for different classes or types of networking devices (e.g., enterprise vs. non-enterprise) and the closest or best setting is selected and used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a power loss detector, wherein the power loss detector monitors a power supply to a monitored networking device to detect an imminent power loss, wherein a port of the monitored networking device is connected to a bypass module; and
the bypass module that includes:
a bypass controller, wherein the bypass controller:
in response to detecting the imminent power loss, determines whether to bypass the monitored networking device based at least in part on a bypass enable, wherein the bypass enable is set to a value that depends upon a role associated with the monitored networking device; and
in the event it is determined to bypass the monitored networking device, configure an electromechanical relay in the bypass module to create a new connection associated with the port of the monitored networking device that bypasses the monitored networking device, wherein the configured electromechanical relay maintains the new connection for at least some time after the imminent power loss; and
the electromechanical relay.

2. The system recited in claim 1, wherein the monitored networking device includes the power loss detector and the bypass module.

3. The system recited in claim 1, wherein the electromechanical relay includes a latched electromechanical relay.

4. The system recited in claim 1, wherein the electromechanical relay includes a doubled-winding and latched electromechanical relay.

5. The system recited in claim 1, wherein:
the bypass module further includes one or more bypass settings which in turn include the bypass enable.

6. The system recited in claim 1, wherein creating the new connection includes creating the new connection between the port of the monitored networking device and a second port of the port of the monitored networking device.

7. The system recited in claim 1, wherein creating the new connection includes creating the new connection between the port of the monitored networking device and a second port of the port of the monitored networking device, wherein the port and the second port are associated with one or more of the following: an Ethernet port or an RJ45 Ethernet connector.

8. The system recited in claim 1, wherein:
the bypass module further includes one or more bypass settings which in turn include the bypass enable; and
the bypass enable is set to TRUE in the event the monitored networking device is associated with a standby device in a software-defined wide area network (SD-WAN) and is set to FALSE in the event the monitored networking device is associated with an active device in the SD-WAN.

9. The system recited in claim 1, wherein data is forwarded, via the new connection that is created, to a third-party networking device.

10. The system recited in claim 1, wherein:
the bypass module further includes one or more bypass settings which in turn include: (1) the bypass enable and (2) a watchdog timer value; and
determining whether to bypass the monitored networking device is further based at least in part on a determination whether a watchdog timer associated with the watchdog timer value in the one or more bypass settings has expired.

11. The system recited in claim 1, wherein detecting the imminent power loss is based at least in part on a setting associated with a detection voltage.

12. A method, comprising:
using a power loss detector to monitor a power supply to a monitored networking device to detect an imminent power loss, wherein a port of the monitored networking device is connected to a bypass module; and
using a bypass controller in a bypass module to:
in response to detecting the imminent power loss, determine whether to bypass the monitored networking device based at least in part on a bypass enable, wherein the bypass enable is set to a value that depends upon a role associated with the monitored networking device; and in the event it is determined to bypass the monitored networking device, configure an electromechanical relay in the bypass module to create a new connection associated with the port of the monitored networking device that bypasses the monitored networking device, wherein the configured electromechanical relay maintains the new connection for at least some time after the imminent power loss.

13. The method recited in claim 12, wherein the monitored networking device includes the power loss detector and the bypass module.

14. The method recited in claim 12, wherein the electromechanical relay includes a doubled-winding and latched electromechanical relay.

15. The method recited in claim 12, wherein:
the bypass module further includes one or more bypass settings which in turn include the bypass enable.

16. The method recited in claim 12, wherein creating the new connection includes creating the new connection between the port of the monitored networking device and a second port of the port of the monitored networking device.

17. The method recited in claim 12, wherein creating the new connection includes creating the new connection between the port of the monitored networking device and a second port of the port of the monitored networking device, wherein the port and the second port are associated with one or more of the following: an Ethernet port or an RJ45 Ethernet connector.

18. The method recited in claim 12, wherein:
the bypass module further includes one or more bypass settings which in turn include the bypass enable; and
the bypass enable is set to TRUE in the event the monitored networking device is associated with a standby device in a software-defined wide area network (SD-WAN) and is set to FALSE in the event the monitored networking device is associated with an active device in the SD-WAN.

19. The method recited in claim 12, wherein:
the bypass module further includes one or more bypass settings which in turn include: (1) the bypass enable and (2) a watchdog timer value; and
determining whether to bypass the monitored networking device is further based at least in part on a determination whether a watchdog timer associated with the watchdog timer value in the one or more bypass settings has expired.

20. The method recited in claim 12, wherein detecting the imminent power loss is based at least in part on a setting associated with a detection voltage.

* * * * *